(12) United States Patent
Arani et al.

(10) Patent No.: US 11,210,547 B2
(45) Date of Patent: Dec. 28, 2021

(54) REAL-TIME SCENE UNDERSTANDING SYSTEM

(71) Applicant: NavInfo Europe B.V., Eindhoven (NL)

(72) Inventors: Elahe Arani, Eindhoven (NL); Mahmoud Salem, Eindhoven (NL)

(73) Assignee: NAVINFO EUROPE B.V., Eindhoven (NL)

( * ) Notice: Subject to any disclaimer, the term of this patent is extended or adjusted under 35 U.S.C. 154(b) by 197 days.

(21) Appl. No.: 16/662,381

(22) Filed: Oct. 24, 2019

(65) Prior Publication Data

US 2020/0302214 A1    Sep. 24, 2020

Related U.S. Application Data

(60) Provisional application No. 62/878,984, filed on Jul. 26, 2019, provisional application No. 62/821,365, filed on Mar. 20, 2019.

(51) Int. Cl.
    *G06K 9/46* (2006.01)
    *G06T 7/215* (2017.01)
    *G06N 3/04* (2006.01)

(52) U.S. Cl.
    CPC ......... *G06K 9/4628* (2013.01); *G06N 3/0454* (2013.01); *G06T 7/215* (2017.01)

(58) Field of Classification Search
    CPC ............. G06K 9/4628; G06K 9/00791; G06K 9/6262; G06T 7/215; G06N 3/0454
    See application file for complete search history.

(56) References Cited

U.S. PATENT DOCUMENTS

| 2018/0268220 A1* | 9/2018 | Lee ........................... G06K 9/34 |
| 2019/0046068 A1* | 2/2019 | Ceccaldi ................... G06T 7/11 |

(Continued)

FOREIGN PATENT DOCUMENTS

CN    109190626 A  *  1/2019

OTHER PUBLICATIONS

Attention-based Context Aggregation Network for Monocular Depth Estimation (Year: 2019).*

(Continued)

*Primary Examiner* — Nizar N Sivji
(74) *Attorney, Agent, or Firm* — Peacock Law P.C.; Justin Muehlmeyer

(57) ABSTRACT

Real-time scene understanding system employing an object detection module with an algorithm for localization and classification of objects in an image, and a semantic segmentation module with an algorithm for classification of individual pixels in the image, wherein the system comprises an encoder module operable on an input image for the extraction of notable features in the input image, one or more attention modules to attribute among the notable features in the input image as provided by the encoder a relative contribution of each of such notable features in an output image to be reconstructed from the input image, and a decoder module for reconstructing the output image using the notable features, wherein the reconstructed output image is made available to the object detection module with the algorithm for localization and classification of objects in the image, and to the semantic segmentation module with the algorithm for classification of individual pixels in the image.

9 Claims, 3 Drawing Sheets

(56) References Cited

U.S. PATENT DOCUMENTS

| | | | | |
|---|---|---|---|---|
| 2019/0147341 A1* | 5/2019 | Rabinovich | ............ | G06K 9/3208 |
| | | | | 382/156 |
| 2020/0349711 A1* | 11/2020 | Duke | ........................ | G06N 3/08 |
| 2020/0364876 A1* | 11/2020 | Mohan | ...................... | G06F 3/012 |
| 2020/0374534 A1* | 11/2020 | Chen | ...................... | G06K 9/6215 |
| 2021/0181366 A1* | 6/2021 | Fan | ........................ | G06N 3/0472 |

OTHER PUBLICATIONS

FuseNet: Incorporating Depth into Semantic Segmentation via Fusion-Based CNN Architecture (Year: 2017).*
A conceptual framework of computations in mid-level vision (Year: 2014).*
Multi-View Deep Learning for Consistent Semantic Mapping with RGB-D Cameras (Year: 2017).*
LaneNet: Real-Time Lane Detection Networks for Autonomous Driving (Year: 2018).*

* cited by examiner

REAL-TIME SCENE UNDERSTANDING SYSTEM

CROSS-REFERENCE TO RELATED APPLICATIONS

This application claims priority to and the benefit of U.S. Provisional Patent Application No. 62/878,984, filed on Jul. 26, 2019, entitled "Real-Time Scene Imaging System", and U.S. Patent Application No. 62/821,365, filed on Mar. 20, 2019, entitled "Devices and Methods of Real-Time Unified Object Detection and Semantic Segmentation", and the specifications and claims thereof are incorporated herein by reference.

BACKGROUND OF THE INVENTION

Embodiments of the present invention relate to a real-time scene understanding system employing an object detection module with an algorithm for localization and classification of objects in an image, and a semantic segmentation module with an algorithm for classification of individual pixels in the image.

Scene understanding is one of the core prerequisites for autonomous driving and mapping. However, it is a highly complex problem and requires a substantial amount of resources. This complexity is tackled by dividing this problem to a set of subtasks including object localization and classification (detection), semantic segmentation, and instance segmentation.

Given a predefined set of object categories, for instance, car, pedestrian, truck, bus, traffic signs etc. as may be typically found in autonomous driving environments, the task of the object detection algorithms is to localize and classify the salient objects inside an image, thus providing an approximate location of the objects as well as the precise classification of the object categories in the scene.

Semantic segmentation algorithms on the other hand, receive an input image and classify the category of individual pixels in the input image, thereby also providing a broader image parsing which in turn leads to a better evaluation of the scene.

To date, automated scene perception for navigation and mapping are typically addressed separately. However, scene perception algorithms face numerous other challenges in real-world autonomous driving scenarios. For instance, the driving environment can only be partially observable due to numerous occlusions in a typical driving scenario thereby providing an approximate understanding of the scene. In addition, real-time performance of the above-mentioned perception algorithms using low-power embedded devices is a critical requirement for feasible deployment in autonomous vehicles.

As mentioned previously, achieving real-time performance in perception-based tasks such as object detection and semantic segmentation is a critical requirement. Moreover, it is also desired that the tasks can be performed using low power embedded devices for feasible deployment in autonomous vehicles.

The combined requirement of real-time performance on low power devices in itself presents a significant challenge for artificial intelligence AI based solutions. The problem becomes even more acute when multiple perception tasks are to be performed simultaneously on embedded devices especially when the targeted solution endeavours to achieve the high accuracy levels required for mission critical tasks such as reliable autonomous driving. Furthermore, the high accuracy levels of detection and segmentation are required despite various "noise" elements such as partial occlusion of important objects often encountered in driving scenarios.

In general, there are two main approaches in computer vision area to solve more than one task at once: a) by task-specific modules for each task separately or b) by multi-task learning where some modules are shared by multiple tasks. The former approach is not resource optimized, since the scene information is perceived by each model separately thereby leading to independent predictions. This in turn, leads to duplication and redundancy in an already scant resource pool, especially on low power embedded devices. On the other hand, although the latter approach tries to share the resources, existing state-of-the-art techniques are not sufficiently optimized to be used for real-time scenarios.

An aspect of embodiments of the present invention is to provide a solution to the above pictured problems. To that end a real-time scene understanding system is proposed in accordance with the features of one or more of the appended claims.

BRIEF SUMMARY OF THE INVENTION

Embodiments of the present invention are directed to a system comprising an encoder module operable on an input image for the extraction of notable features in the input image, one or more attention modules to attribute to the extracted features, so as to weigh the informative signals, exploit global relationship between these features and distribute them back to local features in the input image, and a decoder module for reconstructing the input image using the extracted features, wherein the reconstructed image and/or information regarding the notable features is made available to the object detection module that is provided with the algorithm for localization and classification of objects in the image, and to the semantic segmentation module that is provided with the algorithm for classification of individual pixels in the image. This shared U-Net architecture with encoder-decoder networks and skip connections between them through the attention modules provide both local information as well as deep global features to the network. Embodiments of the present invention thus provide an effective and real time scene detection of images of the outside world to support autonomous driving and mapping.

Preferably the relative contribution or weight of each of the extracted features is provided by the attention module(s) to the decoder module, and the relative contribution of the reconstructed information is provided to the detection module, and to the semantic segmentation module. The attention module(s) of the system are preferably applied to multi-scale inputs to detection and segmentation modules is/are thus responsible for applying different levels of scene (information) abstraction which is desirable for complex environments containing objects with varied spatial dimensions (i.e. tiny, small, medium and large sized objects). This technique is suitable for many applications including autonomous vehicles and mapping. Also, given the full weight sharing provided by the encoder and decoder to the other modules, this architecture is optimized for power and memory consumption and thereby suitable for embedded devices supporting the same as well as different categories of objects for each of the tasks. The application of multiple attention modules to multi-scale extracted features facilitates a multi view, local/global abstraction of a scene which in turn increases the robustness of the system to note semi-observable and occluded objects which is one of the primary benefits of the system.

Desirably the attention modules attribute the relative contribution of each of the notable features in the input image across a depth dimension.

In one embodiment of the present invention, the encoder module comprises a convolution neural network (CNN) to extract notable features in the input image. Accordingly, the encoder module of the system of the invention comprises a vision based deep convolution neural network (CNN) to reconstruct categories of interest on both object level as well as pixel level from a real-time camera feed. Subsequently, the extracted features are shared amongst the multiple task-specific sub-modules which perform detection and segmentation simultaneously. The learnt weights derived by the encoder and decoder are fully shared amongst the other modules leading to higher accuracy and reduced resource requirements.

Suitably in one embodiment, the shared encoder module comprises a feature extraction algorithm to extract discriminative features from the input image by applying the viewpoints of both tasks. Preferably the feature extraction algorithm provides a hierarchy of features in the input image at different scales and with different spatial resolution.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
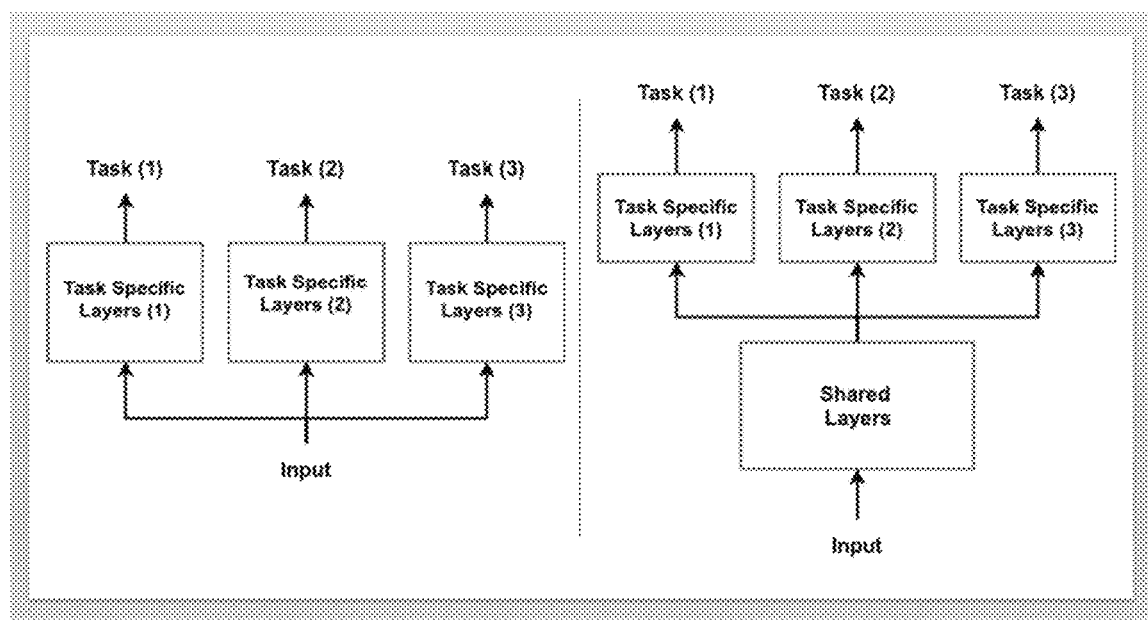
FIG. 1 is a schematic diagram of two main approaches to solve multiple tasks according to an existing system.

The existing system illustrated in FIG. 1 addresses scene perception for navigation and mapping primarily in two different ways: a) by task-specific models for each task separately or b) by multi-task learning where the same information is shared by multiple tasks. A visual description of the two approaches is given in FIG. 1. The former approach is not resource optimized, since the scene information is perceived by each task separately thereby leading to independent predictions. This in turn, leads to duplication and redundancy in an already scant resource pool (especially on low power embedded devices). On the other hand, although the latter approach tries to share the resources, existing state-of-the-art techniques are not sufficiently optimized to be used for real-time scenarios.

Figure 2:
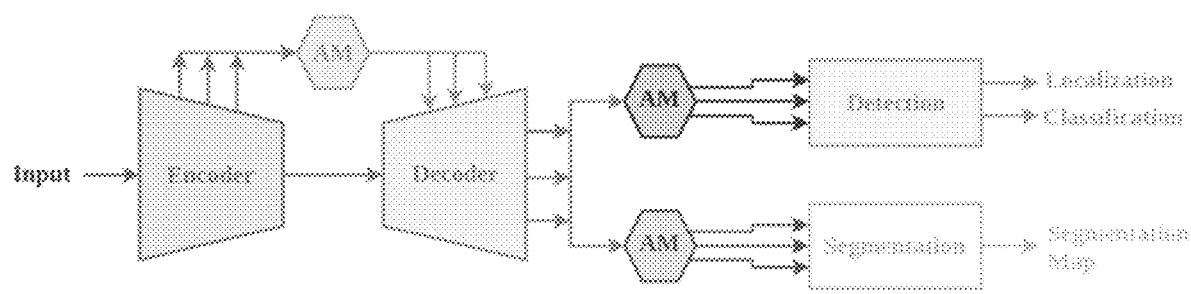
FIG. 2 is a schematic diagram according to an embodiment of the present invention of the solution to the problems created by the existing system illustrated in FIG. 1.

As shown in FIG. 2, an embodiment of the present invention uses a fully shared multi-task and multi-learning technique, comprising attention-based modules. The attention modules are preferably responsible for applying reweighting to different levels of scene (information) abstraction extracted by encoder and/or decoder which is desirable for complex environments containing objects with varied spatial dimensions (i.e. tiny, small, medium and large sized objects). This technique is suitable for many applications including autonomous vehicles and mapping. Also, given the full weight sharing of the two tasks, this overall architecture is optimized for power and memory consumption and thereby suitable for embedded devices supporting same as well as different categories of tasks.

Architecture Details:

The input images from the camera are preferably fed to the encoder which uses a light-weight convolutional neural network to extract the relevant discriminative features from the image, forming high-level feature maps of the scene. This creates a hierarchy of features of the scene containing different spatial resolution and receptive fields, which provides a very robust technique for detecting and segmenting objects of various sizes. The attention module(s) (AM) is/are preferably used to refine the features of each scale, before up-scaling these features maps in the decoder as outlined in FIG. 2.

The Encoder:

The encoder is the core of the system, it is a feature extracting module that operates upon the input images and extracts the important features. The encoder preferably comprises a set of convolution layers which decrease the spatial dimensions of the input images and which results in a set of feature maps that hierarchically present the basic features of the input images and encodes it into lower dimension.

The Attention Module:

The attention module is preferably a soft attention mechanism that aims to help the module attend on the more important information. It calculates the global features across the depth dimension and calculates the percentage of contribution of each filter through a sigmoid function. The application of attention modules facilitates the combination of global context into the local extracted features. Applying it to the multiple scales enhances a multi view of a scene, which in turn increases the robustness of the system to note semi-observable and occluded objects which is one of the primary benefits of the system of the invention.

The Decoder:

The decoder is preferably the module that is responsible for reconstructing or decoding the encoded feature into higher dimension. The output of this module contains all the important information that will be used for detection and segmentation. The decoder looks at multiple points with different scales of the encoder to have general information and be able to capture features on different scales.

The Detection Module:

The detection module is preferably the module responsible for outputting the location and class of each object based on the information fed to it through the decoder.

The Segmentation Module:

The segmentation module is preferably the module responsible for outputting the class of each pixel in the input image based on the information fed to it through the decoder.

Optimization for Embedded Devices

Further, the network is preferably optimized for resource-restricted devices such as embedded devices. Since a lot of custom layers (parts of the algorithms in higher level Deep Learning Frameworks such as TensorFlow, PyTorch, Caffe) need to be coded, using Ten-sorRT enables optimizing and converting to TensorRT models. This requires advanced expertise in parallel programming, GPU architecture and CUDA programming. This optimization makes the models superior in terms of optimization compared to many published research.

The advantage of going through all this effort is simple. The entire overhead that occurs during inference (due to host-device transfer, memory overhead, etc.) is minimized. It does so by performing layer fusion, kernel auto-tuning, multi-stream execution and dynamic tensor memory which help in reducing the latency and memory overhead allowing for a speedy inference.

Another major advantage is that looking up the sheet of the embedded device is easy and based on how it performs with different precision levels calibration the model precision can be achieved so it can best make use of the available hardware. For example, it is possible to reduce precision from 32-bit floating point to an 8-bit precision, which can immensely increase inference times.

Another major advantage is the Deep Learning Accelerator (DLA) library that decreases the computation time for some layers such as Convolution, maxpooling, transpose etc.

Example of Use

An embodiment of the present invention is further illustrated by the following non-limiting example.

Maps are a key element for autonomous driving and producing high-definition maps. For instance, the situation in China represents a highly challenging task due to the sheer variation of traffic, road and navigational signs and markings. Thus, to test the limits of the proposed system, it was trained and tested on a very large set of driving scenarios collected from China. The collected dataset represents a wide variety of driving conditions with varied scale of road and traffic sign markings.

Results indicate that the proposed system achieves highly accurate predictions for both the detection and segmentation of road markings and traffic signs despite the huge variability of traffic signs, road markings and Chinese letters, which makes the detection and segmentation tasks significantly harder.

Figure 3:
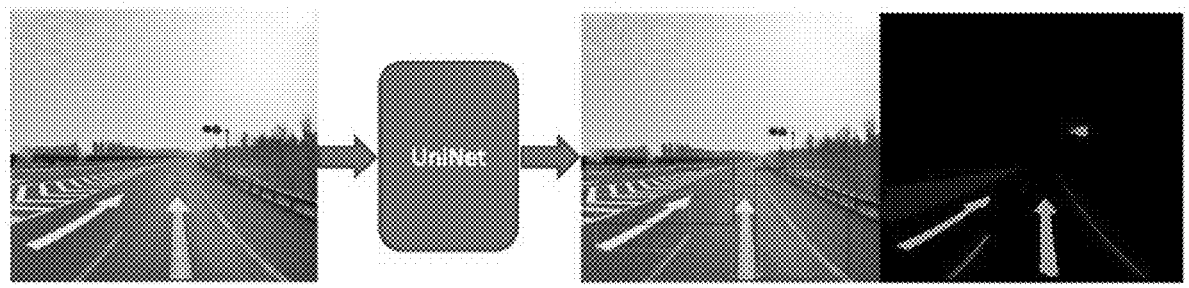
FIG. 3 illustrates an example of camera inputs and outputs of the system according to an embodiment of the present invention.

FIG. 3 shows that a sample image is provided to UniNet, representing the system. The output images are the detections and segmentation mask, respectively. UniNet first extracts the features from this natural scene image. The extracted features from multiple scales are weighted based on their importance in the attention module(s) (AM). Then, the decoder reconstructs the scene based on multiple scales of the latest compressed encoded features by the encoder, which are weighted by the attention module. The reconstructed features from the decoder via the attention module outputs are send to both the detection and segmentation modules separately. Using these features, the detection module predicts the location and label of interesting objects; and the segmentation module predicts the label of each pixel in input image.

Figure 4:
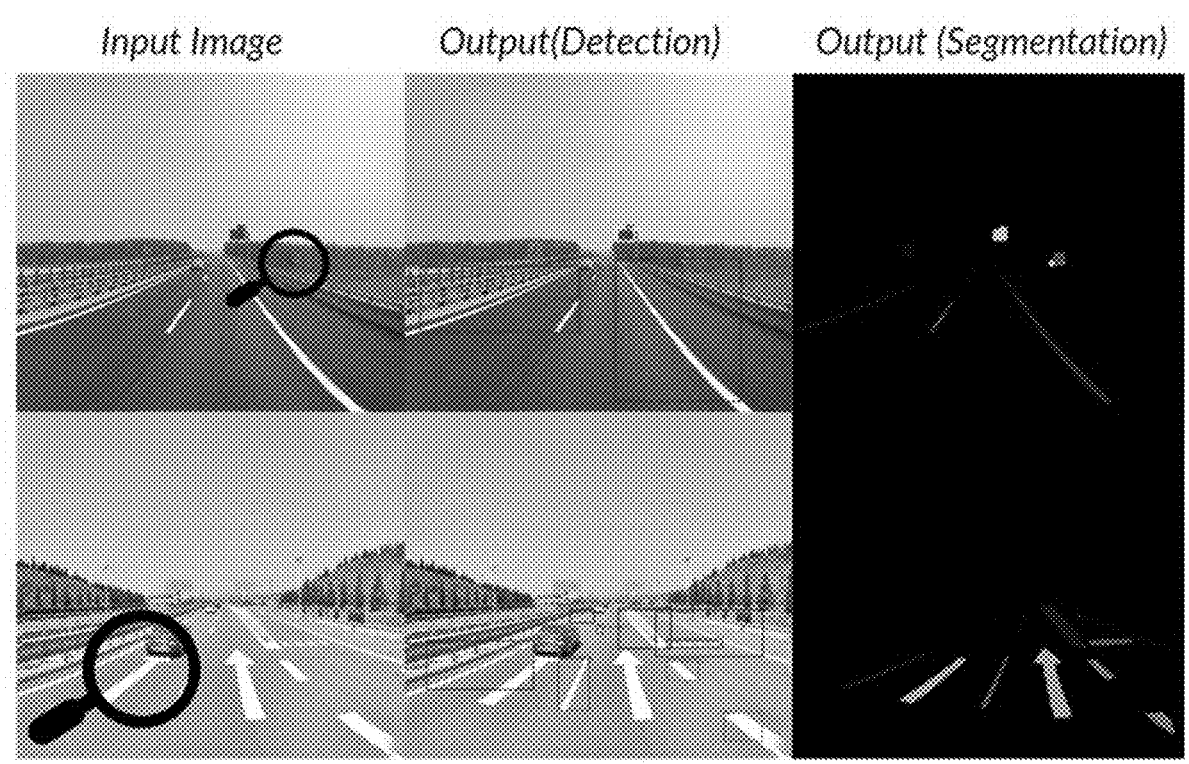
FIGS. 4 and 5 illustrate examples of the quality of detection and segmentation of occluded objects according to an embodiment of the present invention.
Figure 5:
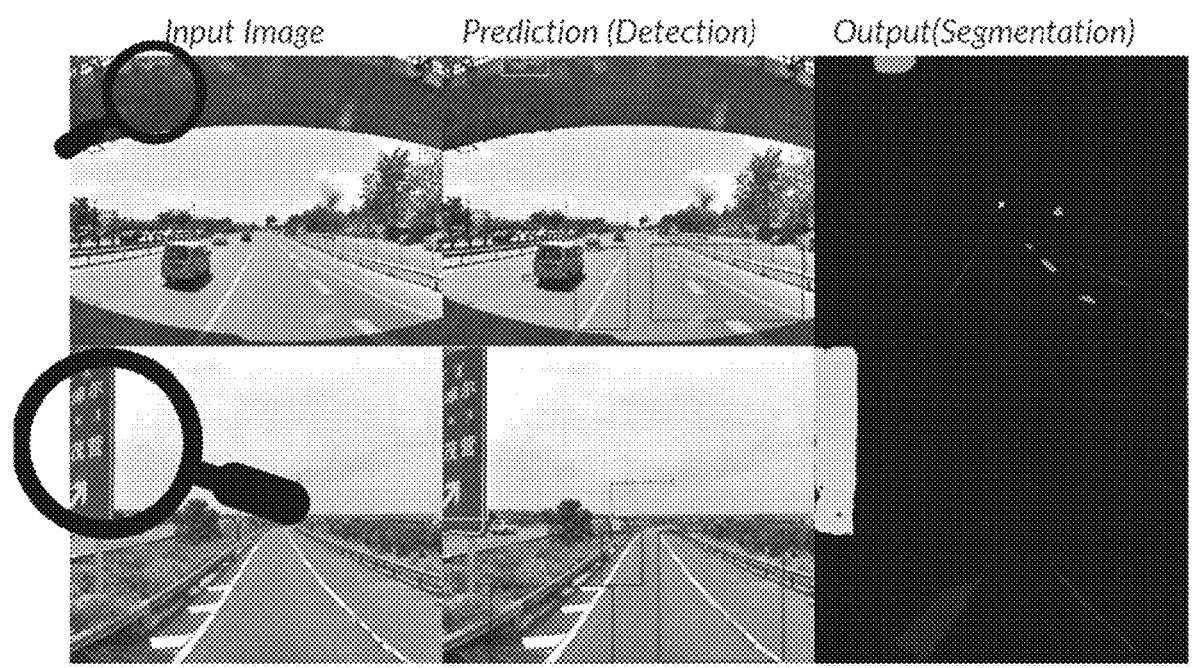

FIGS. 4 and 5 finally show examples of the quality of detection and segmentation of occluded objects, with on the left the input image being processed according to the invention, in the middle the detected a predicted output image, and on the right a segmented output provided by the system.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Although the invention has been discussed in the foregoing with reference to exemplary embodiments of the system of the invention, the invention is not restricted to any particular embodiment which can be varied in many ways without departing from the invention and other embodiments can achieve the same results. The discussed exemplary embodiment shall therefore not be used to construe the appended claims strictly in accordance therewith. Variations and modifications of the present invention will be obvious to those skilled in the art and it is intended to cover in the appended claims all such modifications and equivalents. Unless specifically stated as being "essential" above, none of the various components or the interrelationship thereof are essential to the operation of the invention. Rather, desirable results can be achieved by substituting various components and/or reconfiguration of their relationships with one another. Embodiments described herein are merely intended to explain the wording of the appended claims without intent to limit the claims to any exemplary embodiment. The scope of protection of the invention shall therefore be construed in accordance with the appended claims only, wherein a possible ambiguity in the wording of the claims shall be resolved using this exemplary embodiment.

The invention claimed is:

1. A system comprising:
an object detection module comprising an algorithm for localization and classification of objects in an image;
a semantic segmentation module comprising an algorithm for classification of individual pixels in the image;
an encoder module operable on an input image for an extraction of notable features in the input image;
at least one attention module to attribute to the extracted features a relative contribution or reweighing of each of such notable features such that these features contain global context as well as spatial local information;
a decoder module for reconstructing the output image using the notable features, wherein the reconstructed output image and/or information regarding the notable features is made available to the object detection module and to the semantic segmentation module; and
wherein the relative contribution or weight of each of the notable features is provided by the at least one attention module to the decoder module, to the detection module, and to the semantic segmentation module.

2. A system according to claim 1, wherein the system comprises multiple attention modules to facilitate injection of a global context into local information in a multi view of a scene depicted by an image.

3. A system according to claim 1, wherein the at least one attention module is arranged to apply reweighing of different levels of scene information abstraction so as to support detection of complex environments containing objects with different spatial dimensions.

4. A system according to claim 1, wherein the at least one attention module attributes the relative contribution of each of the notable features in the input image across a depth dimension.

5. A system according to claim 1, wherein the encoder module comprises at least one convolution neural network (CNN) to detect, segment and extract notable features regarding both objects as well as pixels in the input image.

6. A system according to claim 1, wherein the object detection module and the semantic segmentation module are operable simultaneously on the same output image from the decoder and/or the notable features provided by the at least one attention module.

7. A system according to claim 1, wherein the encoder module comprises different convolutional neural networks operative on different speeds and accuracies to enable tailoring performance of the encoder module to actual circumstances during detection.

8. A system according to claim 1, wherein the encoder module comprises a feature extraction algorithm to extract discriminative features from the input image.

9. A system according to claim 8, wherein the feature extraction algorithm of the encoder module provides a hierarchy of features in the input image at different scales and with different spatial resolution.

* * * * *